United States Patent [19]

Essig et al.

[11] Patent Number: 4,596,369
[45] Date of Patent: Jun. 24, 1986

[54] MOUNTING MECHANISM FOR A CONTROL DEVICE

[75] Inventors: Willi Essig, Boeblingen; Wilhelm Stricker, Oestringen-Odenheim, both of Fed. Rep. of Germany

[73] Assignee: E.G.O. Elektro-Geräte Blanc u. Fischer, Fed. Rep. of Germany

[21] Appl. No.: 569,606

[22] Filed: Jan. 10, 1984

[30] Foreign Application Priority Data

Jan. 12, 1983 [DE] Fed. Rep. of Germany ....... 3300797

[51] Int. Cl.$^4$ ................................................. G12B 9/00
[52] U.S. Cl. .................................... 248/27.3; 200/296; 403/242; 403/245
[58] Field of Search ............................ 248/27.3, 27.1; 200/294, 295, 296, 304; 403/245, 242

[56] References Cited

U.S. PATENT DOCUMENTS

| | | | |
|---|---|---|---|
| 3,332,648 | 7/1967 | Selinder | 248/27.3 |
| 3,681,593 | 8/1972 | Genovese et al. | 248/27.3 |
| 3,728,511 | 4/1973 | George et al. | 200/295 |
| 4,105,883 | 8/1978 | Hastings et al. | 248/27.3 |
| 4,398,073 | 8/1983 | Botz et al. | 200/295 |

FOREIGN PATENT DOCUMENTS 2251676  5/1973  Fed. Rep. of Germany.
2604783 10/1979  Fed. Rep. of Germany.
2930719  1/1981  Fed. Rep. of Germany.

Primary Examiner—Ramon S. Britts
Assistant Examiner—Ramon O. Ramirez
Attorney, Agent, or Firm—Steele, Gould & Fried

[57] ABSTRACT

A mechanism for mounting a control device on an implement shield defining a shield plane, the control device having a body formed with slots, the mechanism comprising: the shield having a guide with guidance projections slidably interengageable with the slots on the body of the control device, the guidance projections and slots being connectable to one another by relative movement parallel to the shield plane; the shield having at least one positioning stop forming an abutment against the connecting movement; and, the shield having at least one stop spring for resiliently urging the body against the at least one positioning stop after the connecting movement, whereby the control device is securely positioned on the shield. When the control device is to be mounted in a cutout in the shield, the guidance projections, the at least one positioning stop and the at least one stop spring are shaped from material of the shield bounding the cutout. The guidance projections are preferably straps of L-shaped cross-section, projecting firstly from the shield towards the interior of the implement and then toward one another, engaging in the slots in the body of the control device. In an alternative embodiment, the mechanism may further comprise a sheet metal plate covering the front surface of the body, having bent edges for engaging in the slots in the body, having threaded or plug-receiving retainers and having a securing slot for the setting shaft of the control device.

10 Claims, 7 Drawing Figures

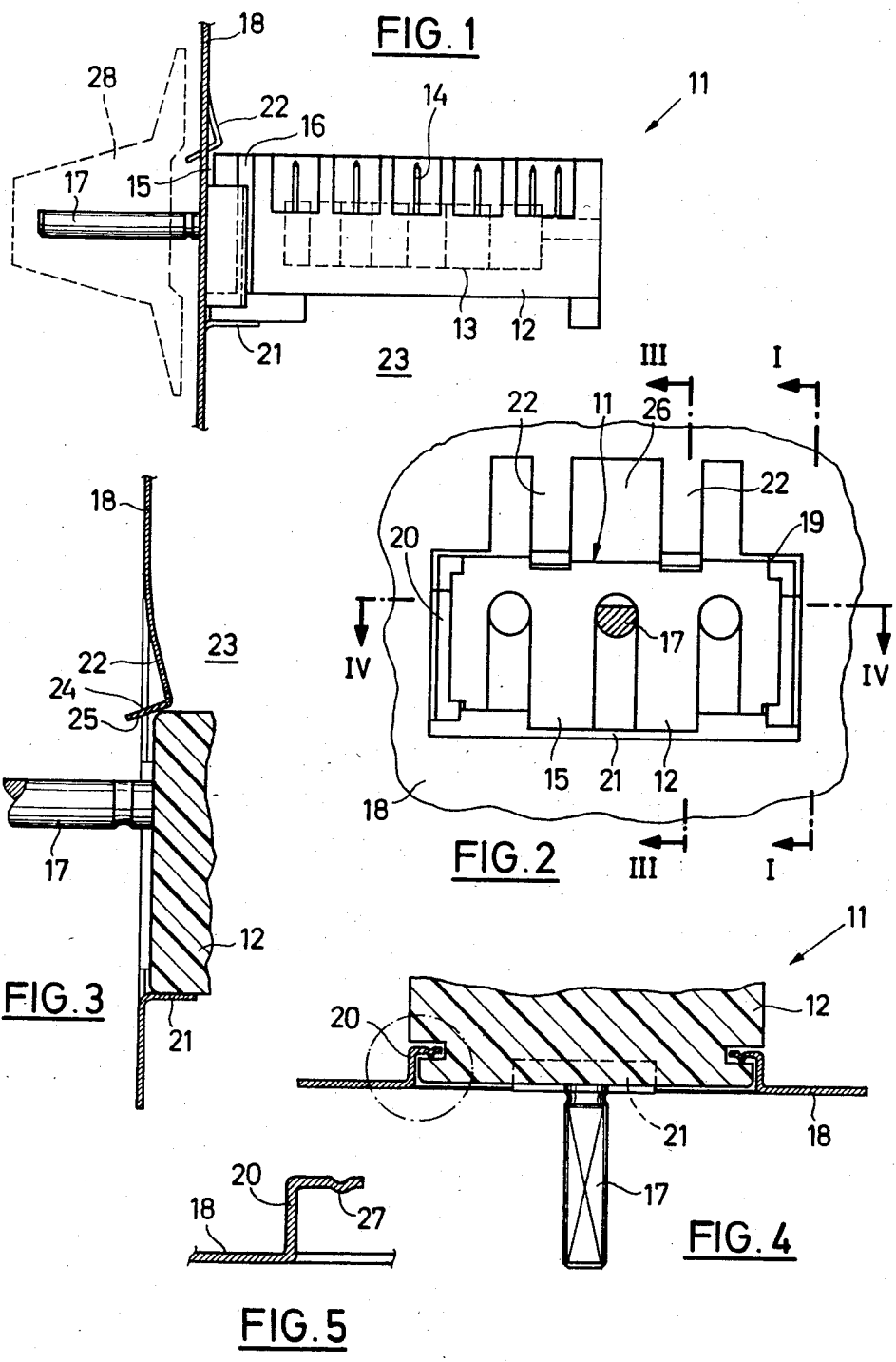

MOUNTING MECHANISM FOR A CONTROL DEVICE

BACKGROUND OF THE INVENTION

The invention relates to a fixing mechanism for a control device on a shield of an implement, particularly a switch, regulator or the like on a cooker shield with slots on the body of the control device.

Electrical switches are normally arranged on the front of cookers or similar appliances, for example washing or dishwashing machines in such a way that their setting shafts, on which the knobs are placed, project forwards through the shield. Fixing normally takes place by means of screws, which fix the control device to the shield.

German Pat. No. 2,604,783 discloses a seven-level switch, whose front surface on the operating side is covered by a sheet metal plate. The lateral edges of the plate are bent round a projection of the switch body, so that the now inwardly inclined outer edge of the plate engages in lateral slots of the switch body. Tilted-over sheet metal flaps on the upper and lower end of each edge effect a longitudinal securing action. In the vicinity of the projecting stampings on the sheet metal plate, threaded holes are provided, through which the fixing extend, with which the switch can be screwed down from the shield. A slot in the sheet metal plate engages in a groove on the setting shaft of the switch and secures it in the longitudinal direction (i.e. against pulling away).

SUMMARY OF THE INVENTION

The object of the invention is to provide a fixing mounting mechanism for such a control device, in which the number of parts is reduced and installation is facilitated.

This object is achieved by a mechanism for mounting a control device on an implement shield defining a shield plane, the control device having a body formed with slots, the mechanism comprising: the shield having a guide with guidance projections slidably interengageable with the slots on the body of the control device, the guidance projections and slots being connectable to one another by relative movement parallel to the shield plane; the shield having at least one positioning stop forming an abutment against the connecting movement; and, the shield having at least one stop spring for resiliently urging the body against the at least one positioning stop after the connecting movement, whereby the control device is securely positioned on the shield. In a presently preferred embodiment, the shield is provided with a cutout adjacent to which the control device is mounted, the guidance projections, the at least one positioning stop and the at least one stop spring being shaped from material of the shield bounding the cutout. In most instances, the control device is provided with a setting shaft. In such instances, the shield may be formed with an insertion slot running parallel with the guide, the setting shaft projecting through the shield plane. The slots in the body of the control device are lateral grooves opening away from one another. The guidance projections are preferably straps of L-shaped cross-section, the straps projecting firstly from the shield towards the interior of the implement and then toward one another, engaging in the lateral grooves. In an alternative embodiment, the mechanism may further comprise a sheet metal plate covering the front surface of the body, having bent edges for engaging in the slots in the body, having means for receiving screws or mounting plugs and having a securing slot for the setting shaft.

Whereas hitherto mounting has been by means of screws, it is not possible by simple plugging in or insertion. For this purpose, the control device is inserted substantially parallel to the shield plane and preferably vertically from top to bottom. The guidance projections, which are preferably constructed as wedge means located behind the shield plane, engage in the groove provided on the switch body and guide the switch body parallel to the shield surface. A lower stop member limits the vertical insertion movement and stop springs snap in at the upper end of the switch, so that the latter is securely positioned.

Thus, in this embodiment, there is no need for the otherwise necessary sheet metal plate and the guidance projections. The positioning stop and the stop springs can be shaped from the shield material and advantageously abut against a cutout of the shield. Thus, in place of the conventionally provided opening for the setting shaft and the fixing bore, only an extra cutout with a few bent portions is stamped, thereby economizing on the sheet metal plate and the fixing screws. The sliding in effect also greatly facilitates fitting.

The shield can have an insertion slot running parallel to the guide for a setting shaft projecting through the shield plane and provided on the control device. In this case, the control device can be inserted in its finished state. However, it would also be possible to fix the control device without a setting shaft and then insert the same from the front through the shield into the switch. The control device setting shaft can be fixed by pressure from a trip cam mounted on the setting shaft.

Preferably, two stop springs are provided, which are arranged in substantially parallel spaced manner. As a result of this construction, the control device is secured in a largely non-tilting manner. The stop springs preferably have chamfered stop faces, which act on the control device for maintaining a contact pressure. In this case, the securing device not only acts as a barb-like means for securing the control device in its position, but additionally ensures that this fixing is resilient and therefore rattleproof.

It is particularly advantageous that it is possible to use for the fixing mechanism according to the invention a switch body as used with the hitherto known construction with the sheet metal plate according to German Pat. No. 2,604,783. The slots which are in any case provided then constitute the grooves for the guidance projections. This means that if screw fixing is desired or required, the control device body can also be provided with a sheet metal plate. This leads to an advantageous reduction in the number of types and makes it possible to use the control device as a spare and replacement for older equipment, without modifying its body. The preferred use of the fixing mechanism is the fixing of switches or regulators to cooker shields. However, it can also be used for fixing other control devices for similar equipment, for example programme switches on washing machines or the like.

The features of the claims and other features which can be gathered from the following description in conjunction with the drawings may be realised singly or in various subcombinations in an embodiment of the invention.

BRIEF DESCRIPTION OF THE DRAWINGS

The invention is described in greater detail hereinafter relative to non-limiting embodiments illustrated in the drawings, wherein:

FIG. 1 a side view of a fixing mechanism for a control device in a cooker shield taken along line I—I in FIG. 2.

FIG. 2 a front view of a cooker shield with an incorporated control device.

FIG. 3 is a section view taken along line III—III in FIG. 2.

FIG. 4 a section view taken along line IV—IV in FIG. 2.

FIG. 5 a detail from FIG. 4, in enlarged scale.

DETAILED DESCRIPTION OF THE PREFERRED EMBODIMENTS

Figure 6:
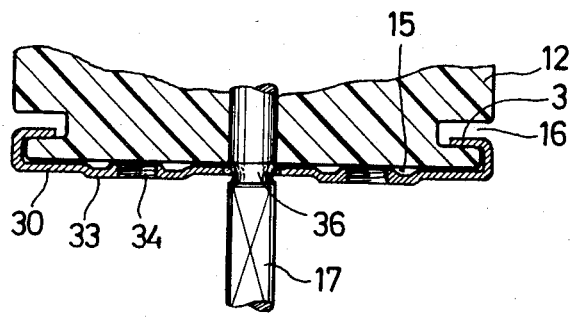
FIG. 6 a view similar to FIG. 4, but of a construction with a screw fixing arrangement.

FIG. 1 shows a control device 11 in the form of a seven-level switch for an electric cooker and it is referred to hereinafter as switch 11. It has a switch body 12 made from an insulating material, for example a duroplastic material. Internally mounted switch springs (not shown), which can be operated by a trip cam 13 (indicated by broken lines). The connecting leads can be mounted on flat connecting pieces 14. With respect to its switch body and its electrical connection means, the switch corresponds to that of German Pat. No. 2,604,783, to which reference is made.

In the vicinity of its operating-side front surface 15 and close to its narrower lateral edges, switch body 12 has in each case a vertical slot 16, which extends over the entire lateral height of body 12. A setting shaft 17 projects from the front surface 15. This shaft is constructed as a conventional circular shaft, which is flattened on one side. Within the switch the shaft projects into the trip cam 13 and rotates the latter. Setting shaft 17 can be bonded into the trip cam 13, so that the latter secures the shaft against axial displacement.

Switch 11 is incorporated into a shield 18 of the electric cooker, which can either be made from the cooker wall material, or can be fitted as a separate part in the cooker. It is made from sheet metal. In the vicinity of switch 11, a cutout 19 is provided in shield 18, which is approximately shaped like the front surface 15 of switch 11, but is somewhat larger than the latter. Cutout 19 has a guidance projection 20 adjacent to its edge on either side and which is in the form of a sheet metal flap or tongue bent towards the interior of the cooker and the cutout (see particularly FIGS. 4 and 5).

Adjacent to the lower edge of cutout 19 a sheet metal flap is bent inwards at right angles and forms a stop 21 (FIGS. 1 and 3), which cooperates with the bottom of switch body 12 for the positioning thereof.

On the upper edge of the cutout, there are three recesses projecting upwards over the upper edge of the switch body and bound to stop springs 22, which in particular have the shape shown in FIG. 3. Thus, there is a flat chamfer directed towards the cooker interior 23, which passes approximately at right angles into an outwardly directed stop portion 24, whose bottom forms a stop surface 25.

The central recess of the three recesses 26 is much wider than setting shaft 17 and the distance between its upper edge and said shaft is greater than the vertical insertion path determined by the cooperation between grooves 16 and guidance projections 20. As can be seen in FIG. 5, a reinforcing corrugation 27 is stamped from the guidance projections constructed in the manner of L-straps and serves to exert a certain contact pressure on the switch body.

It can be gathered from FIGS. 1 to 5, that the fixing of switch 11 to shield 18 merely takes place by the switch being applied to the shield in the vicinity of the cutout, setting shaft 17 projecting forwards through recess 26 and guidance projections 20 still being positioned below groove 16. The switch is then moved vertically downwards, so that the guidance projections 20 engage in grooves 16. Stop springs 22 slide on operating side 15 and are to a certain extent resiliently pressed in. When the bottom of switch body 12 engages on stop 21, the snap springs 22 again snap into the position shown in FIGS. 1 and 3. The stop surface forming an angle differing somewhat from 90° with the insertion direction, engages on the upper leading edge of the switch body under pressure and consequently ensures that the stop spring 22 passes completely into its strain-free position. Thus, there is a permanent contact pressure between shield 18 and switch body 12, which prevents the switch from becoming loose. After the engagement of the switch, it is then possible to place the knob 28, indicated by broken lines, on the setting shaft 17, so that the mechanical installation of the switch is at an end.

Figure 7:
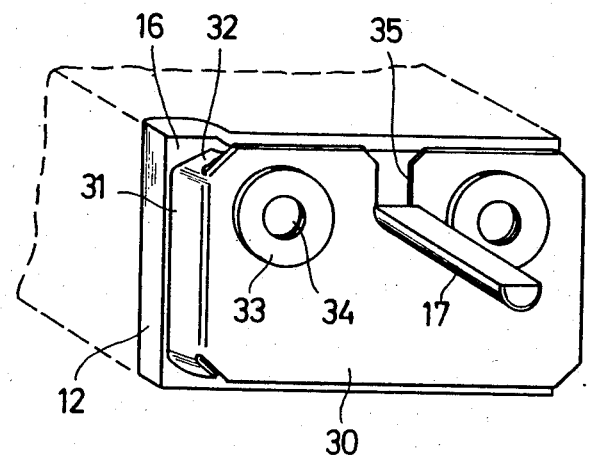
FIG. 7 a perspective view of the embodiment of FIG. 6.

FIGS. 6 and 7 show that a screw fixing is possible with the identical switch body 12. For this purpose, a sheet metal plate 30 is fitted to switch body 12 and completely covers the operating-side front surface 15. This substantially flat plate is bent over in U-shaped manner at both sides, so that its bent-over edge 31 engages in the grooves of switch body 12. Sheet metal flaps 32 projecting upwards and downwards are bent inwards, so that they secure the plate on the switch body. On the operating side, sheet metal plate 30 has two somewhat protuding, stamped, circular projections 33 in whose center are provided threaded bores 34, into which screws can be screwed through the shield. A slot 35 in the plate extends on one side up to the edge and engages in an annular groove 36 on the setting shaft, so that the latter is axially secured and in this case need not be fixed by adhesion or bonding. The latter could also be replaced by other axial fixing procedures for the setting shaft, for example locking devices.

What is claimed is:

1. An implement shield, defining a shield plane, for mounting a control device having a body formed with slots, the implement shield comprising:

an insertion guide defining an insertion axis and having guidance projections slidably interengageable with the slots on the body of the control device;

at least one positioning stop disposed at one axial end of the insertion guide, the guidance projections and slots being connectable to one another by relative movement of the control device and the at least one positioning stop toward one another along the insertion axis, parallel to the shield plane, the guidance projections forming abutment surfaces preventing all movement of a mounted control device in directions away from the insertion axis and the at least one positioning stop forming an abutment surface preventing movement in one direction along the insertion axis; and, at least one stop spring disposed at the other axial end of the insertion guide for resiliently urging a mounted control device against the at least one positioning stop and for releasably preventing movement in the opposite axial direction, whereby the control device may be securely mounted on the shield, yet easily removed therefrom.

2. An implement shield according to claim 1, wherein the implement shield has a cutout behind which the control device is to be mounted; the guidance projections, the at least one positioning stop and the at least one stop spring being shaped from material of the shield bounding the cutout.

3. An implement shield according to claim 1, wherein the implement shield has an insertion slot running parallel with the guide, to accommodate and provide clearance for parts of a control device projecting through the shield plane during the relative connecting movement.

4. An implement shield according to claim 2, wherein the implement shield has an insertion slot running parallel with the guide, to accommodate and provide clearance for parts of a control device projecting through the shield plane during the relative connecting movement.

5. The combination of a control device and a mounting mechanism for mounting a control device on an implement shield defining a shield plane, comprising:

the control device having a body formed with slots, a setting shaft and a trip cam for locking onto the setting shaft;

the shield having an insertion guide with guidance projections slidably interengageable with the slots on the body of the control device, the guidance projections and slots being connectable to one another by relative movement of the control device and the shield parallel to the shield plane as the control device is mounted;

the shield having at least one positioning stop forming an abutment at the end of said relative connecting movement; and, the shield having at least one stop spring for resiliently urging the body against the at least one positioning stop after the connecting movement, whereby the control device is securely positioned on the shield.

6. An implement shield according to claim 1, comprising two stops springs spaced from one another and disposed substantially parallel to one another along a line perpendicular to the insertion axis.

7. An implement shield according to claim 1, wherein the at least one stop spring comprises a chamfered stop surface, adapted to engage a mounted control device and maintain a contact pressure.

8. An implement shield according to claim 1, wherein the guidance projections are oriented towards one another to engage oppositely directed slots in the body of a mounted control device, the guidance projections being straps of L-shaped cross-section, the straps projecting firstly from the shield towards the side of the implement shield on which a control device is mounted and then toward one another.

9. A mechanism for mounting a control device on an implement shield defining a shield plane, the control device having a body formed with slots, the mechanism comprising:

an insertion guide with guidance projections slidably interengageable with the slots on the body of the control device, the guidance projections and slots being connectable to one another by relative movement of the control device along the guidance projections parallel to the shield plane;

at least one positioning stop forming an abutment, stopping the control device at the end of said relative connecting movement; and, at least one stop spring for resiliently urging the body against the at least one positioning stop after the connecting movement; and, a sheet metal plate covering a front surface of the body, the slots in the body being adapted for engagement with the sheet metal plate, the plate having bent edges for engaging the slots in the body, threaded means for receiving screws, and a securing slot for axially-securing the setting shaft to the body .

10. A mechanism for mounting a control device on an implement shield defining a shield plane, the control device having a body formed with slots, the mechanism comprising:

an insertion guide with guidance projections slidably interengageable with the slots on the body of the control device, the guidance projections and slots being connectable to one another by relative movement of the control device along the guidance projections parallel to the shield plane;

at least one positioning stop forming an abutment stopping the control device at the end of said relative connecting movement; and, at least one stop spring for resiliently urging the body against the at least one positioning stop after the connecting movement; and, a sheet metal plate covering a front surface of the body, the slots in the body being adapted for engagement with the sheet metal plate, the plate having bent edges for engaging the slots in the body, means for receiving mounting plugs, and a securing slot for axially-securing the setting shaft to the body.

* * * * *